April 14, 1931. S. F. COLE 1,800,602
AUTOMATIC BACK SCRATCHER FOR ANIMALS
Filed June 19, 1928 2 Sheets-Sheet 1

INVENTOR.
S. F. Cole
BY
Watson E. Coleman ATTORNEY.

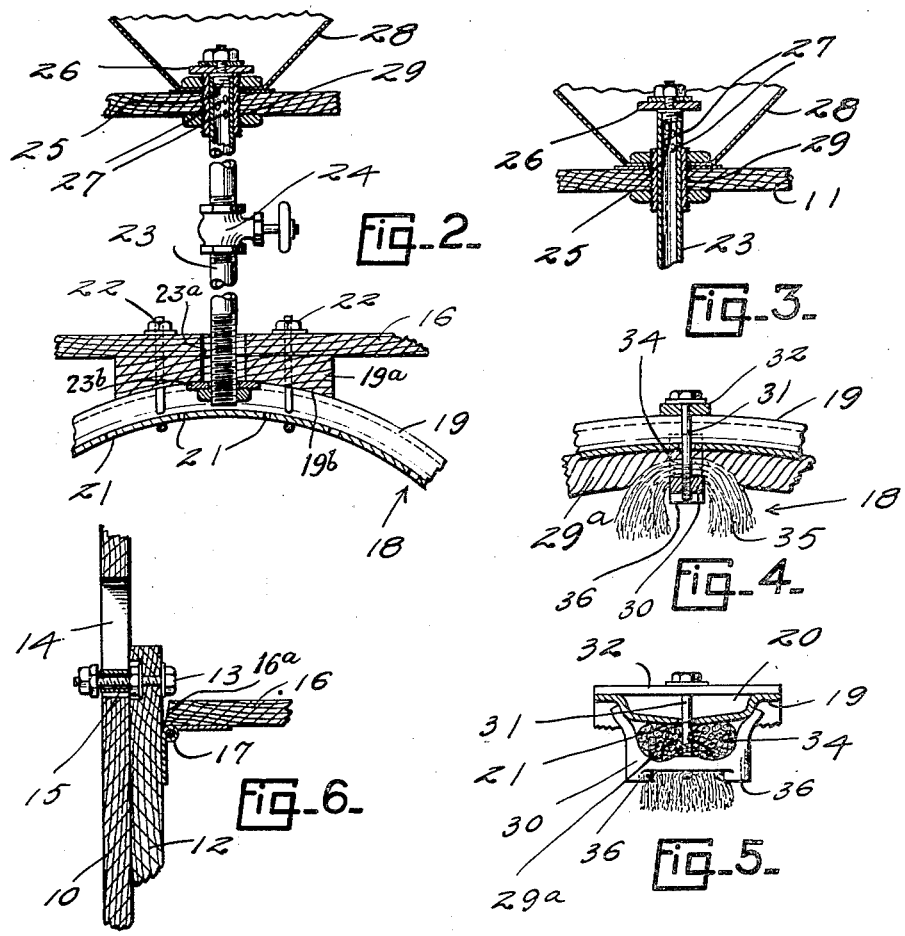

Patented Apr. 14, 1931

1,800,602

UNITED STATES PATENT OFFICE

SAMUEL F. COLE, OF ST. JOSEPH, MISSOURI

AUTOMATIC BACK SCRATCHER FOR ANIMALS

Application filed June 19, 1928. Serial No. 286,567.

This invention relates to an automatic back scratcher for animals and more particularly to a device of this character which will not only provide a scratching mechanism but which will likewise oil the animal during the scratching operation.

A further object of the invention is to provide a device of this character which will automatically adjust itself to the height of the animal employing the same and which is so constructed that it may readily be combined with one or more devices of the same character.

A still further object of the invention is to provide a device of this character which may be readily and cheaply produced, durable and efficient in service and a general improvement in the art.

These and other objects I attain by the construction shown in the accompanying drawings, wherein for the purpose of illustration is shown a preferred embodiment of my invention and wherein:—

Figure 2 is a sectional view through the upper portion of one of the scratching devices and the associated oil supplying means;

Figure 3 is a fragmentary sectional view showing the manner in which the valve is opened by elevation of the associated scratching element;

Figure 4 is a fragmentary longitudinal sectional view showing the manner of securing the wicks thereto;

Figure 5 is a transverse sectional view showing a supporting clamp;

Figure 6 is a detail vertical sectional view showing the manner of mounting the transverse support upon the vertical standards.

Figure 1:
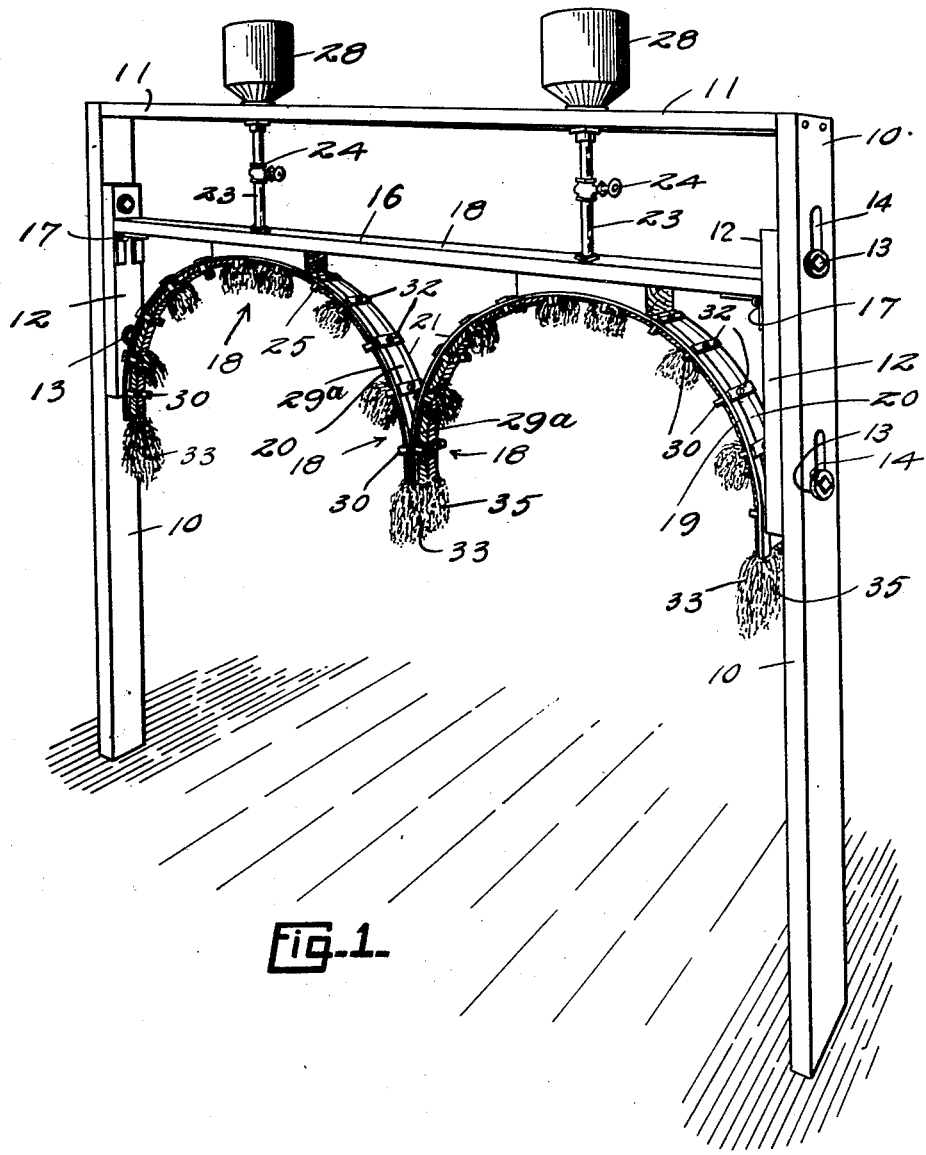
Figure 1 is a perspective view showing a scratching implement constructed in accordance with my invention.

Referring now more particularly to the drawings, the numeral 10 generally designates spaced vertical standards, the upper ends of which are connected by a rigid transverse brace or shelf 11. Each standard 10 has mounted thereon a slide 12, which is connected to the standard by bolts 13 and passing through the slide and through vertical slots 14 formed in the standard. Each bolt is surrounded within the slot by a roller sleeve 15 reducing the frictional engagement of the bolt with the slot and permitting ready vertical movement of the slides upon the standard. Connecting the slides 12 is a bar 16, which is hinged to each slide, as indicated at 17, so that either slide 12 may be shifted upwardly independently of the other slide.

Secured to the bar 16 are one or more oiling devices, two being shown in the present instance, and generally designated at 18. Each oiling device comprises a substantially semi-circular rim 19, the outer surface of which is formed as a trough, as indicated at 20, and more clearly shown in Figure 5. The bottom wall of this trough has spaced openings 21. The rim 19 is rigidly secured to the cross bar 16, as by bolts 22, and a spacing block 19$^a$, having an arcuate lower surface 19$^b$, is arranged between the rim and cross bar and is secured in place by the bolts. A vertical pipe or conduit 23, which is provided with a regulating valve 24, has its lower end arranged in a slot 23$^a$ formed in and extending longitudinally of the cross bar 16 and the spacing block 19$^a$, and a washer 23$^b$ is secured to the lower end of the pipe and the spacing block rests upon the washer. This conduit is plugged at its upper end, as indicated at 25, and has secured to this upper end a valve 26 preferably formed of some material, such as leather.

Immediately below the plug 25, the wall of the pipe is provided with perforations, as at 27. Mounted upon the shelf 11 immediately above the center of each oiling and scratching device is an oil container 28, the securing elements of which include a tube or sleeve 29 directed through the shelf and forming a guide for the upper end of the conduit 23. This conduit, due to the weight of the associated oiling device and cross bar 16, tends to move downwardly, with the result that the perforated portion thereof is normally disposed within the sleeve 29 and sealed thereby and the valve 26 thereof normally seats upon the upper end of this sleeve. It will be obvious, however, that when the rim 19 is elevated for any reason, the bar 16 and conduit 23 will be elevated, with the result that the openings 27 come into communication with the interior of the oil container 28 and oil may pass from the container into the conduit 23 and at a speed regulated by the valve 24 into the trough upon the exterior of the rim, from which it may pass through the openings 21.

Secured to the inner face of the rim are longitudinally extending wick and scratching elements 29$^a$, the securing elements of which preferably comprise substantially U-shaped clamping elements 30 embracing the wick and scratching elements and held against the inner face of the rim by bolts 31, which loosely pass through an associated opening 21 and are likewise passed through a cross bar 32 disposed upon the outer face of the rim. The wick elements preferably constitute pieces of rope, the ends of which, after the rope is secured, are frayed, as indicated at 33, to form brushes. In applying the clamps, other and short lengths of rope, indicated at 34, are secured by certain thereof and the ends of these short lengths are similarly raveled, as indicated at 35. The bottom faces of the U-shaped clamps are preferably formed with lugs 36 which constitute solid and substantial scratching elements arranged at opposite sides and inwardly of the wick elements 29$^a$. As each wick element 29$^a$ is made of rope, and extends longitudinally of the rim 19, the oil passing through the openings 21 in the rim will readily flow throughout the entire length of the wick element and as the result will be evenly spread over the animal. The pipes 23, since the spacing block 19$^a$ rests upon the washers and the valve 26 rest upon the upper ends of the sleeves 29, suspend the cross bar 16 and the parts carried thereby from the shelf 11. The cross bar 16 is normally in a horizontal position with its upwardly and inwardly inclined ends 16$^a$ out of contact with the slides 12, the bolts 13 are normally above the bottom walls of the slots 14, and the outer nuts of the bolts 13 are normally spaced from the outer sides of the standards 10, as shown in Figure 6. The normal spaced relation of these parts permits the cross bar 16 to be rocked about one of the pipes 23. During this movement of the cross bar 16, the other pipe 23 will be raised with respect to its sleeve 29, with the result that this pipe will convey oil to the wick elements 29 carried by the rim with its associate.

In the use of the device, an animal passing beneath the scratching element engages the same with its back, with the result that the scratching element is elevated and a charge of oil permitted to pass from the container 28 to the trough where it may pass through the openings 21 to the wicks to further lubricate the same. In engaging the device with its back, the back of the animal is scratched by the lugs 36 and by the wick elements 29. At the same time, oil is transferred from these wick elements to the skin. The oil employed may be any suitable form of insect repellent. Attention is directed to the fact that by the construction employed, if a single animal engages one of the back scratching and lubricating elements, the valve of this lubricating element will be opened to permit the passage of a charge of oil but the other of the devices will not receive a charge, due to the fact that while its valve may be partially unseated, the openings 27 which are disposed beneath the upper end of the sleeve will not be exposed to the interior of the container.

Since the construction hereinbefore set forth is capable of a certain range of change and modification without materially departing from the spirit of the invention, I do not limit myself to such specific structure except as hereinafter claimed.

I claim:—

1. A back scratcher for animals, comprising containers, pipes extending downwardly from the containers, means mounting the pipes for upward and downward movement with respect to the containers, the pipes communicating with the containers when elevated, means for limiting the downward movement of the pipes and cutting off communication between them and the containers when they are lowered, members carried by the lower ends of the pipes, a cross bar resting upon the members, and oiling devices carried by the cross bar.

2. A back scratcher for animals, comprising containers, pipes extending downwardly from the containers, means mounting the pipes for upward and downward movement with respect to the containers, the pipes communicating with the containers when elevated, means for limiting the downward movement of the pipes and cutting off communication between them and the containers when they are lowered, members carried by the lower ends of the pipes, a cross bar resting upon the members, oiling devices carried by the bar, slides hinged to the ends of the bar, standards and means connecting the slides to the standards for vertical movements with respect thereto.

3. A back scratcher for animals comprising a bowed element, a wick element secured to the under side of the bowed element, and solid scratching elements secured to the bowed element and arranged below and at the sides of the wick element, and means for supplying a liquid to the wick element.

4. A back scratcher for animals, comprising a bowed element, a wick element arranged at the lower side of the bowed element and made of rope, metal clamps securing the wick element to the bowed element and provided with lugs constituting scratching elements and arranged below and at the sides of the wick element, and means for supplying liquid to the wick element.

In testimony whereof I hereunto affix my signature.

SAMUEL F. COLE.